United States Patent
McElligott et al.

(12)

(10) Patent No.: US 6,767,396 B2
(45) Date of Patent: Jul. 27, 2004

(54) PROCESS FOR THE PREPARATION OF AQUEOUS MAGNETIC INK CHARACTER RECOGNITION INK-JET INK COMPOSITIONS

(75) Inventors: Michael J. McElligott, Rochester, NY (US); Donald E. Snyder, Jr., Spencerport, NY (US)

(73) Assignee: Nu-kote International, Inc., Franklin, TN (US)

( * ) Notice: Subject to any disclaimer, the term of this patent is extended or adjusted under 35 U.S.C. 154(b) by 0 days.

(21) Appl. No.: 10/186,440

(22) Filed: Jul. 1, 2002

(65) Prior Publication Data

US 2004/0000254 A1 Jan. 1, 2004

(51) Int. Cl.$^7$ .............................. C09C 1/34; C09C 1/22; C09D 11/00; C01G 49/08
(52) U.S. Cl. .................... 106/453; 106/31.65; 106/456; 106/479; 106/480; 252/62.56; 252/62.59
(58) Field of Search ............................... 106/31.65, 453, 106/456, 479, 480; 252/62.52, 62.53, 62.54, 62.56, 62.59

(56) References Cited

U.S. PATENT DOCUMENTS

| 4,026,713 A | | 5/1977 | Sambucetti et al. |
| 5,026,427 A | * | 6/1991 | Mitchell et al. ........... 106/31.6 |
| 5,240,626 A | | 8/1993 | Thakur et al. |
| 5,547,804 A | | 8/1996 | Nishizawa et al. |
| 5,656,071 A | | 8/1997 | Kappele et al. |
| 5,670,078 A | | 9/1997 | Ziolo |
| 5,746,817 A | * | 5/1998 | Katsen et al. ............ 106/31.65 |
| 5,969,003 A | | 10/1999 | Foucher et al. |

* cited by examiner

Primary Examiner—C. Melissa Koslow
Assistant Examiner—Shalie Manlove
(74) Attorney, Agent, or Firm—Fay, Sharpe, Fagan, Minnich & McKee, LLP

(57) ABSTRACT

A process for preparing an aqueous ink-jet ink composition for MICR applications is provided comprising preparing a metal oxide pre-dispersion combined with an aqueous ink-jet ink composition, wherein the metal oxide pre-dispersion contains metal oxide pigment or particles of a very small particle size, about $0.5\mu$ or less, and exhibiting high remanence of at least 20 emu/g. The metal oxide particles may be coated with a hydrophilic coating, and the pre-dispersion may contain at least one surfactant to aid in the dispersion of the metal oxide particles. Special processing involving the use of conventional and non-conventional grinding techniques and various filtration techniques enhance the compatibility of the MICR ink-jet ink with the ink-jet equipment, resulting in superior ink life and print quality.

13 Claims, No Drawings

PROCESS FOR THE PREPARATION OF AQUEOUS MAGNETIC INK CHARACTER RECOGNITION INK-JET INK COMPOSITIONS

The invention relates to ink-jet ink compositions, and more particularly to a process for the preparation of such ink-jet ink compositions suitable for use in the preparation of MICR documents. Specifically, the invention relates to aqueous ink-jet ink compositions containing extremely small particle size conductive metal oxides that have been treated to enhance performance and suspension parameters, and particular grinding, milling and filtration processing techniques to aid in the enhancement of the performance of such ink-jet ink compositions.

BACKGROUND OF THE INVENTION

Conventional aqueous ink-jet ink compositions contain a dye or pigment, a solvent system, which may be aqueous or non-aqueous in nature, and which may include a combination of various solvents or a single solvent, and various other components such as humectants, surfactants, dispersion aides, biocide or fungicide, and other components. These components are for the most part known in the industry, and when combined according to conventional techniques for ink-jet ink processing and preparation, create inks well suited to various printers and the specific print processing parameters of these printers. The known techniques include mixing in conventional equipment, such as milling equipment.

Of particular interest in this invention are inks suited for use in drop-on-demand and continuous print processing and which contain a conductive metal oxide component. These inks are generally categorized as magnetic inks, and may be used in various applications. One such application is the preparation of magnetic ink character recognition, or "MICR", readable documentation. This type of application involves the use of magnetic ink to print all or part of a document, usually for security purposes For instance, some "documents" where MICR readable ink compositions are used include checks, bonds, security cards, etc. MICR ink may be used to print an entire document, or only a portion thereof. For instance just the bar code region or only certain characters may be printed with MICR readable ink. The document, once printed and subjected to an appropriate source of magnetization, is then passed through or under a MICR reading device, which validates or authenticates the document based on the MICR encoded characters or printed matter. The step of magnetizing the MICR ink once printed and before use imparts a specific magnetic charge to the magnetic component of the ink, causing an alignment of the particles. The particles must then retain the magnetic charge. The capability of a magnetic material to retain the imparted charge is referred to as remanence. Generally, this parameter increases with an increase in the particle size of the magnetic material. However, the larger the particle size the more difficult it is to maintain the particle in suspension within an ink composition. Additionally, the print head nozzles of current ink-jet printers are very small, therefore the particulate matter in an acceptable ink-jet ink must be small in order to avoid clogging the nozzles, whether during printing or over an extended period of time.

This need to maintain high remanence, but to decrease the particle size of the magnetic material to a very small size, presents a unique problem for potential MICR ink-jet ink manufacturers. The challenges of formulating a suitable ink-jet ink for use in MICR printing applications revolve around the need to achieve an ink composition containing very small particle size magnetic material, due to the size of the print head nozzles, and yet maintain the necessary level of remanence within the particulate matter in the ink such that the MICR readable characteristic of the ink is not compromised. Remanence is directly proportional to the size of the particle, thus decreasing the particle size of the magnetic material in order to avoid nozzle clogging of the print heads may also decrease the remanence parameter of the ink. One means of addressing a loss of remanence is to increase the magnetic component loading. This, however, is difficult due to the tendency of the particulate matter to settle out of solution as the amount of particulate matter in the ink composition is increased Various attempts have been made to address the problem of retaining the magnetic pigment or particulate matter in suspension. For example, U.S. Pat. Nos. 5,026,427, 5,240, 626, and 5,656,071 each suggest the use of specific dispersants to maintain the suspension. The 5,656,071 patent discloses an ink composition including a polymeric dispersant to maintain a metal oxide in solution and a co-solvent mixture of 1,3-propanediol or 1,4-butanediol with a second solvent selected from polyethylene glycol-type materials and polyol/polyalkylene oxide condensates. The other patents involve the use of colloidally dispersed magnetite in conjunction with a specified dispersant component. U.S. Pat. No. 5,240,626 discloses an ink including colloidally dispersed magnetite particles coated with a carboxy compound-type anti-agglomeration agent and a dispersing aid. The 5,026,427 patent teaches generally the preparation of a magnetic ink composition containing magnetic particles and specific dispersants to maintain the dispersion. Another means of addressing the suspension issue is set forth in U.S. Pat. No. 4,026,713. This patent discloses the use of a combination of surfactants and glycerol to make stable magnetic inks.

Yet another means of addressing the suspension problem of magnetic inks has been the use of resin components to enhance the oxide suspension. U.S. Pat. Nos. 5,547,804, 5,670,078, and 5,969,003 are examples of this type of response to the problem. In U.S. Pat. No. 5,547,804 a solvent-based dispersion is aided using a co-polymer resin. The 5,670,078 patent discloses the use of an ion exchange-type resin to maintain the dispersion. The 5,969,003 patent teaches the use of a sulfonated polyester resin to achieve and maintain the oxide component in suspension.

While several of the foregoing patents suggest peripherally that the use of the stated techniques to maintain particulate matter in suspension may be applicable to magnetic inks, none really addresses MICR ink and the specific set of problems particular thereto, such as particle size, remanence, and suspension, among other concerns. None satisfactorily addresses the need to increase magnetic particle content or loading, and thus maintain high remanence of the overall ink composition, without jeopardizing the dispersion necessary in order to attain an ink with the desired shelf life and one that will not clog the very small print head nozzles used in ink-jet printing equipment. Finally, no reference addresses the problem of maintaining a good dispersion of metal oxide in the ink-jet ink composition from the aspect of processing of the metal oxide to achieve the necessary small particle size.

SUMMARY OF THE INVENTION

The challenges of formulating a suitable ink-jet ink for use in MICR printing applications revolve around the need to achieve an ink composition containing very small particle size magnetic material, due to the size of the print head nozzles, and yet maintain the necessary level of remanence within the particulate matter in the ink such that the MICR readable characteristic of the ink is not compromised. The invention relates to a means of achieving the foregoing challenge.

One aspect of the invention relates to a process for the preparation of an aqueous MICR ink-jet ink composition comprising a metal oxide dispersion and a suitable ink-jet ink formulation, the dispersion comprising metal oxide particles of very small size, less than about $0.5\mu$, wherein the preparation process includes preparing the metal oxide pre-dispersion and then grinding the pre-dispersion to reduce the size of the magnetic oxide particles prior to the addition of the pre-dispersion to the remaining ink-jet ink formulation components.

Yet another aspect of the invention relates to a process for the preparation of a MICR ink-jet ink composition comprising a metal oxide dispersion and a suitable ink-jet ink formulation, the dispersion comprising metal oxide particles of very small size, less than about $0.5\mu$ wherein the preparation process includes preparing the metal oxide pre-dispersion and then grinding the pre-dispersion using a combination of conventional and non-conventional grinding techniques to reduce the size of the magnetic oxide particles and to reduce the potential for particle agglomeration.

Still another aspect of the invention relates to a process for the preparation of a MICR ink-jet ink composition comprising a metal oxide dispersion and a suitable ink-jet ink formulation, the dispersion comprising metal oxide particles of very small size, less than about $0.5\mu$, prepared by first obtaining a suitable metal oxide pre-dispersion, and then grinding and filtering the pre-dispersion to reduce the size of the magnetic oxide particles and to reduce the potential for particle agglomeration. The filtering process may involve the use of a single filter or may involve the use of a step-down filtration regimen.

Still other inventive aspects will become apparent to the skilled artisan from a reading of the Detailed Description of the Invention which follows

DETAILED DESCRIPTION OF THE INVENTION

The invention relates to the use of particular processing techniques for the purpose of achieving a metal oxide pre-dispersion containing extremely small particle size metal oxides which remain in suspension over an extended period of time and the use of the same pre-dispersion in aqueous MICR ink-jet ink compositions Of special interest is the capability of the comparatively small particle size metal oxides to exhibit adequate or better remanence. Additionally, the MICR ink-jet ink prepared in accord with one or more of the processing techniques described herein does not exhibit any tendency to clog the small nozzles of the ink-jet print head, despite the particulate content of the ink.

An ink-jet ink composition meeting the foregoing criteria comprises a metal oxide pre-dispersion which is mixed with an ink-jet ink formulation containing conventional ink-jet ink components. This dispersion includes specific metal oxide components that have been specially prepared in order to achieve the desired performance. This preparation involves subjecting the pre-dispersion to conventional and/or non-conventional grinding techniques, and may be further subjected to particular filtration techniques to achieve the smallest particle size without experiencing agglomeration. The dispersion once processed in this manner may then be included in an ink-jet ink composition suitable for use in MICR applications.

Magnetic Iron Oxides for MICR Ink-Jet Ink

Magnetic iron oxides in conventional MICR transfer application coatings typically exhibit a size of $2.0\mu$ (microns) or larger. Since these coatings consist of a dried film containing iron oxide, binders and oils, the iron oxide is held in the dried binder matrix, after the solvent is evaporated. Therefore, settling problems are not an issue.

The magnetic iron oxide used in MICR ink-jet applications, however, differ from these conventional MICR coatings due to the fact that the ink-jet ink format requires the use of an aqueous ink composition. The iron oxide intended for use in MICR ink-jet applications must be produced in smaller particle size than conventional applications, such as conventional drop-on-demand and thermal transfer coatings, because it must pass through the much smaller orifices characteristic of ink-jet print heads. Further, the metal oxide must exhibit and retain the proper magnetic properties (as the magnetic particle size decreases the magnetic properties in general will deteriorate with time), must have good dispersibility within aqueous liquid systems, and must have good hydrophillic suspension properties. These properties are not as stringently required with conventional MICR applications that are based on non-aqueous solvent suspensions or hot melt wax technologies.

Commercially available oxides do not normally meet the requirements for ink-jet applications. Generally, they do not exhibit the right combination of properties. Oxides suitable for ink-jet applications must be extremely fine in particle size without experiencing the usual loss of magnetic properties inherent in size reduction of magnetic particulate matter. Suitable ink-jet oxides must also be hydrophillic in nature in order to provide good dispersion characteristics, and to provide good emulsion properties. The latter parameters relate directly to the ability of the oxide to exhibit minimum settling and to further demonstrate the proper wetting of the oxide with the other water-soluble ingredients generally present in an ink-jet ink composition.

Another concern in the formulation of MICR ink-jet inks as opposed to conventional MICR inks presents itself in the form of the ink, i e., MICR ink-jet inks must be fluid, and not dry. Because iron oxide has a specific gravity of approximately 5 it has a natural tendency to settle to the bottom of a fluid ink composition, resulting in a non-homogenous fluid having an iron oxide rich lower layer and an iron oxide deficient upper layer. Therefore, a main challenge in developing MICR ink-jet ink is keeping the iron oxide homogeneously suspended in the fluid ink composition, and having the size of the iron oxide particles small enough to pass through the orifices of an ink-jet print head. The iron oxide must also meet the requirement of having sufficient magnetic signal strength to be readable in MICR reader/sorter equipment, such as that employed by the banking industry. Achieving sufficient signal strength becomes increasingly difficult as the metal oxide particle size diminishes and the practical limits on percent content of metal oxide in the ink composition are reached The magnetic property that is most important is remanence, which should be at least a minimum of 25 emu/g. The higher the remanence value the stronger the readable signal. A particle exhibiting higher remanence will require less total percent iron oxide in the ink formula and will improve the suspension properties over an ink formula containing a particle with lower remanence used at a higher percent iron oxide content Although magnetite or synthetic magnetic iron oxide is the preferred magnetic component for MICR ink-jet ink applications, there are other materials that may also be employed. Any reference to an iron oxide component is equally applicable to these other metal oxides and metal-containing compounds. For example, cobalt and/or manganese may be substituted in part for the iron component in the oxide compound to yield bi- or tri-metallic materials with the proper magnetic properties Chromium complexes which are used in the audio and video tape industry are another possible example. Another example is neodymium-iron-boron-lanthanum (NdFeBLa) powder as supplied by UltraFine Powder Technology of Woonsocket, R.I.

Additionally, compounds without any iron content provide another possibility. Such materials include, but are not limited to, certain copper germanium oxide and vanadium oxide complexes. Yttrium manganese hydrogen has magnetic properties and compounds where the yttrium is substituted with rare earth elements (Gd, Tb, Dy, Ho) may also be used.

The foregoing materials are representative of the type of metal and/or metal-containing compounds which may be used in conjunction with iron, or as a substitute for iron, in the production of MICR ink-jet inks.

MICR ink-jet ink must also exhibit low viscosity, typically on the order of less than about 5 cps and more preferably on the order of about 1–2 cps, in order to function properly in both drop-on-demand type printing equipment, such as thermal bubble jet printers and piezoelectric printers, and continuous type print mechanisms. The use of low viscosity fluids, however, adds to the concerns of successfully incorporating metal oxides into the ink solution because particle settling will increase in a low viscosity, thinner fluid as compared to a more viscous, thicker fluid.

In an attempt to address the foregoing concerns, i.e, particle size, magnetic signal strength, suspension, viscosity, and nozzle clogging, a variety of commercially available metal oxides were evaluated with regard to their suspension properties. All metal oxides evaluated were iron oxide compounds Use of the same base metal oxide, but in different forms and with various coatings provided a more accurate comparison of the affect of these parameters on the settling/suspension properties of metal oxides. In conducting this evaluation, each of the following oxides was used to formulate a 10% suspension in water, wherein the iron oxide pigment was slowly added to water followed by 10 minutes of high speed mixing. These suspensions were then allowed to settle. Table I sets forth the results of this evaluation

TABLE I

Metal Oxide Pigment Data Comparison

| Example No. | Metal Oxide Pigment | Settling/ Dispersion Characteristics | Remanence emu/gm | Particle Size Mean/Max. (μm) |
|---|---|---|---|---|
| #1 | Iron Oxide (standard dry particles) | 30% Dispersion layer | 30.30 | 0.27/0.68 |
| #2 | Coated Iron Oxide (standard dry particulate with aluminum silicate coating) | Slowest Settling Rate (60% Dispersion Layer) | 31.80 | 0.27/0.68 |
| #3 | Dry Milled Iron Oxide | Starts settling after <5 min (10% Dispersion Layer) | 21.00 | 0.07/NA |
| #4 | Coated Iron Oxide Wet Cake | Slow Settling Rate (60% Dispersion Layer) | 30.80 | 0.27/0.68 |
| #5 | Coated Iron Oxide (hammermilled) | Slow Settling Rate/Good Dispersion | 30.80 | 0.27/0.68 |
| #6 | Coated Iron Oxide Wet Cake (hammermilled; 60 2% in water and 58 2% in water) | Slow Settling Rate/Good Dispersion | 30.80 | 0.27/0.68 |
| #7 | Iron Oxide (standard dry particulate, repulped) | Fast Settling Rate | 32.10 | 0.27/0.68 |
| #8 | Iron oxide (standard dry particulate) | Very Fast Settling Rate | NA | 0.07/NA |
| #9 | Iron oxide (standard dry particulate) | Very Fast Settling Rate | NA | NA/NA |
| #10 | Iron oxide (standard dry particulate) | Thick Dispersion/ Poor Filterability | 36.10 | NA/NA |
| #11 | Iron oxide (standard dry particulate) | Settling Good/ Filterability Fair | 15.40 | NA/NA |
| #12 | Coated Iron Oxide (very small particle size) | Slow Settling Rate/Good Dispersion | 28.50 | 0.13/0.35 |

Based on the foregoing, it has been concluded that an aluminum silicate coating on the iron oxide functions to keep the oxide in suspension for a longer time than the same oxide having the same particle size but without the specified coating. For example, note the settling/dispersion performance of the iron oxide pigments in Examples 1 and 2.

Additional testing was conducted to determine whether an advantage with respect to achieving an improved suspension could be realized by using the iron oxide in the wet cake form. For this trial, two 30% suspensions in water were prepared, one including the iron oxide of Example No. 2 (iron oxide with aluminum silicate coating) and another including the iron oxide of Example No. 4, coated iron oxide wet cake. Both formed pastes that were observed to be stable over an extended period of time.

Other iron oxides were also evaluated. The most promising oxides of all tested were the iron oxides of Example No. 2 and No. 4 (iron oxide in the dry and wet cake form, respectively) and Example No. 12 (small particle size iron oxide). Examples 2 and 4 were coated with aluminum silicate. This hydrophillic coating imparts to the oxide particles a tendency to remain as separate particles with less tendency to agglomerate. Example No 12 had the smallest particle size of any oxide tested, measuring a mean particle size of $0.13\mu$. This oxide also exhibited good remanence (~28–29 emu/g), and had a hydrophillic surface coating to promote good dispersibility in an aqueous medium.

In addition to the use of aluminum silicate as an appropriate coating for the metal oxide particulate, other inorganic silicates such as sodium silicate, potassium silicate, cupric silicate and other inorganic silicates may be employed. Other hydrophillic coatings such as metallic stearates, metallic phosphate esters, metallic sulfonites and other similar compounds may also be used to coat metal particulate components with good results.

Surfactants for MICR Ink-Jet Ink

The formulation of MICR ink-jet ink gives rise to yet another unique consideration, in addition to that of choosing a suitable oxide component. This consideration revolves around the difficulty in obtaining a good dispersion. One reason for this difficulty is the high density of the iron oxide material and the inherent tendency of the oxide to settle out of solution. It has now been determined that one means to achieving a good dispersion with the iron oxide is to treat the metal oxide particle pre-dispersion with a hydrophilic surfactant or a combination of surfactants. Surfactants, or surface active agents, are substances that function to increase the spreading and wetting properties of a liquid, and usually reduce the overall viscosity and surface tension of the liquid.

The surface-active molecule must be at least partly hydrophilic when being incorporated into an aqueous liquid medium. Therefore, a particular type of molecular structure readily lends itself to use as a surfactant. This molecular structure includes a water-soluble or hydrophilic component, and a water insoluble or hydrophobic component. The hydrophobe is usually the equivalent of a hydrocarbon having from about 8 to 18 carbons, and can be aliphatic, aromatic, or a mixture of both The sources of hydrophobes are normally natural fats and oils, petroleum fractions, relatively short synthetic polymers, or relatively high molecular weight synthetic alcohols, and the like. The hydrophilic groups give the primary classification to surfactants, and are categorized as anionic, cationic or non-ionic in nature. The anionic hydrophiles generally belong to a group including carboxylates (soaps), sulphates, sulphonates, phosphates, and the like. The cationic hydrophiles are generally a form of an amine product. The non-ionic hydrophiles associate with water at the ether oxygens of a polyethylene glycol chain. The hydrophilic end of the surfactant is strongly attracted to the water molecules of an aqueous solution. The force of attraction between the hydrophobic component of the surfactant and the water is only slight As a result, the surfactant molecules align themselves at the surface and internally so that the hydrophile end is oriented toward the water and the hydrophobe is oriented away from the water. This internal group of surfactant molecules is referred to as a micelle Because of this characteristic behavior of surfactants to orient at surfaces and to form micelles, all surfactants perform certain basic functions. However, each different type of surfactant excels in certain functions and has others in which it is deficient. Dispersants are surfactants that suspend a solid in water or some other liquid In this instance, the surfactant functions to form what amounts to a protective coating around the suspended material, and the hydrophilic ends associate with the neighboring water molecules. In addition to the manner in which the characteristics of a specific surfactant affect the stability of a suspension, the particle size and density of the suspended material also affect the stability of the suspension. Therefore, each factor must be addressed to achieve a desired result.

In applying the foregoing to the use of iron oxide pigments in the formulation of aqueous MICR ink-jet inks, it is important to note that if the outer surfactant coating is hydrophilic there is a greater tendency to have an affinity with water through hydrogen bonding and ionic charge complexes. Both hydrogen bonding and ionic charge complexing of a material in an aqueous medium impart better suspension properties, i.e., less settling, to a solid material. It has now been determined that the best results with respect to the desired level of suspension are obtained by first adding particular surfactants to water with thorough mixing, followed by the slow addition of the iron oxide of choice with agitation for a period of time, about 10 to about 15 minutes.

It has been determined that the combined effect of the foregoing parameters achieves an enhanced result that cannot be achieved by the use of any one method or component alone, though each aspect in and of itself does enhance the ink performance. Best results are obtained by preparing a metal oxide pre-dispersion which includes the use of metal oxides of small particle size with high remanence, the use of metal oxides with special coatings, the use of a surfactant component, and the use of metal oxides in the wet cake form.

Processing for MICR Ink-Jet Ink

Once a determination has been made regarding the various components, particularly the metal oxide particulate, to be used in the MICR ink-jet ink, special processing parameters may be used to further enhance the ink's performance. While an ink formulated without this processing, if it includes coated metal oxide particulates in keeping with the foregoing, will demonstrate superior print quality and operational performance, use of various component features in conjunction with any or all of the processing parameters set forth hereafter will further enhance the ink and the performance thereof in a synergistic manner.

Grinding and Step-Down Filtration of MICR Ink-Jet Ink Dispersions

As was stated previously, it has been determined that one manner of achieving a MICR ink-jet ink with suitable magnetic properties is to first prepare a metal oxide pre-dispersion which can subsequently be used to formulate the MICR ink-jet ink. This dispersion will include the specific metal oxide components, specially prepared with regard to particle size, remanence, and coatings, in conjunction with an aqueous medium containing a surfactant component. Once this dispersion has been prepared, particular grinding techniques may be used to reduce the size of the individual magnetic oxide particles and to reduce particle agglomeration so that the particles can freely pass through the very small orifice openings characteristic of ink-jet print heads. There are several alternative means suitable for decreasing the particle size of the metal oxide particulate matter in the ink dispersion. One method to reduce the particle size of the metal oxides is to use conventional grinding techniques, such as ball milling. This type of technique is time dependent, i.e., the longer the dispersion is subjected to the grinding process the smaller the particle size that can be achieved. A second method that is suitable for use in decreasing the particle size of the metal oxides in the dispersion is the use of non-conventional grinding methods combined with and employed as a post-grinding scheme after the use of conventional grinding means. Additionally, a step-down filtration method may be employed to achieve the desired small particle size.

For example, the following demonstrates the effect using conventional grinding followed by a step-down filtration process. An aqueous metal oxide pre-dispersion exhibiting 44% solids was prepared, including a coated iron oxide in the wet cake form, as shown in Table I, Example 6.

Dispersion 1

| | |
|---|---|
| Coated Iron Oxide Wet Cake (58.2% solids in water, Ex. 6)* | 68.70% |
| Distilled Water | 27.30% |

-continued

| | |
|---|---|
| Surfonyl 324 CT (Surfactant) | 2.00% |
| Tamol 731A (Surfactant) | 2.00% |
| Total | 100.00% |

*Ex. 6 from Table I

This dispersion was prepared by adding the iron oxide pigment to an aqueous solution slowly with continued high speed mixing, for about 10–15 minutes. This mixture was then mixed for 2 hours on a Roller Mill without any grinding media This dispersion, when measured on a Hiriba particle size measurement instrument, exhibited a mean particle size of $0.871\mu$ and a maximum particles size of 3 $409\mu$.

The sample thus prepared was then put into a ball mill with ¼" steel balls and milled for 4 days. After this milling process the dispersion was diluted down from 44% solids to 30% solids with distilled water. The sample now had the following values when measured on the Hiriba instrument: mean particle size of $0.504\mu$ and a maximum particle size of $1.318\mu$. Therefore, the 4 day ball mill grinding process reduced the mean particle size by $-0.367\mu$ and the maximum particle size by $-2.083\mu$.

This same sample, which had been ball milled for 4 days, was then subjected to a microfluidization process comprising 3 passes at 15 psi. This treatment further reduced the particle size, resulting in a mean particle size of $0.277\mu$ and a maximum particle size of $0.877\mu$. Therefore, the microfluidizing procedure further reduced the mean particle size by $-0.227\mu$ and the maximum particle size by $-0.441\mu$.

At various points during the foregoing processing, the iron oxide dispersion was filtered using an $11\mu$ filter and the filtrate was measured to record the percent of original solids captured. The following data was recorded.

Initial Percent solids in sample: 30%

Percent of Original Solids in Filtrate

| | Unground | 1 day Ball Mill Grinding | 4 days Ball Mill Grinding |
|---|---|---|---|
| $11\mu$ Filter | 0% | 7.1% | 42.1% |

The foregoing clearly demonstrates that grinding for an extended period of time reduced the particle size and the particle agglomeration. This is shown in the increase in percent solids in the filtrate with a given filter size, in this instance an $11\mu$ filter, after 4 days of ball mill grinding as compared to 1 day of ball mill grinding.

Additionally, a comparison was made of the percent solids in the filtrate from single to series filtration after 4 day ball mill grinding. In this testing, once again the original dispersion was used. The results are shown below:

Initial Percent solids in sample: 30%

Percent of Original Solids in Filtrate After 4 days Ball Mill Grinding

| | |
|---|---|
| $6\mu$ Filter (Single) | 9.3% |
| $20\mu$, $6\mu$, $3\mu$ (Series) | 24.0% |

This data shows a greater yield of smaller particles, of less than $3\mu$, with series filtration than there is with the larger filter size, of $6\mu$, with a single filtration. It is theorized that by subjecting the sample to a series filtration process, the fewer larger particle sizes are removed first, which in a single filtration set-up would cause more immediate blockage and thereby lower the percent solids yield. Series filtration produced approximately 3 times the yield with a smaller particle size than single filtration at a larger particle size, i.e., 24.0% from 9.3%.

Yet another aspect was considered. A comparison was made of percent solids in the filtrate from single to series filtration after 4 days ball mill grinding plus additional non-conventional grinding. This comparison showed a further improvement in yield over the prior testing.

Initial Percent solids in sample. 30%

Percent of Original Solids in Filtrate After 4 days Ball Mill Grinding & Microfluidizing

| | (3 passes at 15,000 psi) |
|---|---|
| $6\mu$ Filter (Single) | 25.4% |
| $20\mu$, $6\mu$, $3\mu$ (Series) | 53.5% |

The additional step of microfluidizing increased the yield by almost 3 times, i.e., 25.4% from 9.3%, through a single $6\mu$ filter. The use of series filtration increased the yield by another 2 times, i.e., 53.5% from 25.4%.

Another example of this type of processing on an ink-jet dispersion containing iron oxide pigment is set forth hereinbelow. In this Dispersion 2 the iron oxide pigment used was a dry particulate coated iron oxide consistent with that noted in Table I, Example 2. This dispersion was prepared in the same manner as Dispersion 1, was processed in a ball mill with ¼" steel balls and milled for a period of 4 days, and was then diluted down from 44% solids to 30% solids with distilled water Dispersion 2

| | |
|---|---|
| Coated Iron Oxide (Standard Dry Particulate, Ex. 2)* | 40.00% |
| Distilled Water | 56.00% |
| Surfonyl 324 CT (Surfactant) | 2.00% |
| Tamol 731 A (Surfactant) | 2.00% |
| Total | 100.00% |

*Ex. 2 from Table I

As with Dispersion 1, the mean and maximum particle sizes for Dispersion 2 were measured using a Hiriba instrument. The mean particle size for the original dispersion was $0.450\mu$, with a maximum particle size of $151\mu$. In comparing these measurements with those rendered from Dispersion 1, which was processed under identical conditions, it was noted that Dispersion 2 exhibited a smaller mean and maximum particle size. This difference was attributed to the inherent smaller particle size of the iron oxide used to make the dispersion. Dispersion 2 was also processed in a microfluidizer under the same conditions as Dispersion 1, and was passed through the same series of filters as used to evaluate Dispersion 1. The results of the series filtration showed an 88.20% solids yield through $20\mu$, $6\mu$, and $3\mu$ filter series. Thus, an increase in percent solids yield from 53.5% to 88.2%, or an increase of +34.7%, was seen.

Given the foregoing, it has been concluded that several factors bear directly on the reduction of particle size and particle agglomeration. First, the use a small size metal oxide having a specific hydrophilic coating to aid in achieving a proper dispersion exhibited the best possible results. Also, it has been shown that there are alternative means for achieving small particle size, including conventional grinding techniques, such as ball milling, attritor grinding, cyclomill grinding, and sand milling Non-conventional techniques including microfluidizing may also be used. The best results were achieved with a method that involved conventional grinding followed by a non-conventional grinding technique. Finally, the use of step-down filtration has been shown to give a greater yield of smaller particle size material than a single filtration process. Most importantly, it has been shown that the combined use of two or more of the above methods results in a synergistic affect, not attainable by using any one method alone and greatly enhanced beyond the affects one might expect from adding the affects of the individual techniques.

Formulating the MICR Ink-Jet Ink Using the Metal Oxide Dispersion

Once the metal oxide dispersion has been prepared in accord with the foregoing processing and procedures, the dispersion may be incorporated into an ink composition suitable for use in ink-jet printing equipment. The precise formulation for the ink is dependent to some degree on the type of print engine the ink will be used in, i.e., drop-on-demand or continuous, but in general the ink-jet ink will include some or all of the conventional ink-jet ink components. Among these components are colorants, humectants, dye or pigment stabilizers, surfactants, buffering agents, biocides, and water-soluble resins, to name a few. This list is not intended to be limitative of the components that may be used to formulate the ink-jet ink that will include the metal oxide dispersion, but rather is intended to exemplify some of the components that may be needed to properly formulate the final ink-jet ink.

In order to more completely demonstrate the ink-jet ink that is the subject hereof, an ink-jet ink was formulated and then tested in both drop-on-demand and continuous type printing equipment.

For the drop-on-demand testing, the ink-jet ink including the metal oxide dispersion prepared as specified herein was loaded into an HP45A cartridge and tested in an HP895 ink-jet printer. The HP45A cartridge was filled with the MICR ink-jet ink, and the print output font was configured with ANSI MICR specified characters on an IBM compatible computer. The printing media used was standard check stock MICR characters were generated on the check stock and evaluated for proper MICR performance per ANSI standards with an RDM MICR verifier.

Drop-On-Demand Ink-Jet Ink Formulation A

MICR Ink-Jet Formulation A

| | |
|---|---|
| Dispersion 1 (40% oxide; ball milled for 4 days) | 35.00 |
| Carbon Black Ink-Jet Ink* | 35.00 |
| Deionized Water | 29.50 |
| Ultadditive 3010E/50 (defoamer) | 0.50 |
| Total | 100.00 |
| Percent Solids | 24.93 |
| Percent Pigment (Oxide + Carbon Black) | 15.26 |
| Percent Oxide | 14.00 |
| *Carbon Black Ink-Jet Ink: | |
| Cabojet 300 (15.1% Carbon Black in water) | 23.82 |
| Distilled Water | 53.99 |
| 2-Pyrollidone | 18.73 |

-continued

| | |
|---|---|
| 1,5-Pentanediol | 3.32 |
| Surfonyl 465 | 0.09 |
| Proxel GL (biocide) | 0.09 |
| Total | 100.04 |

The ink-jet ink formulated according to the above recipe was placed in an HP45 A cartridge and the machine was operated to generate the printing of 45 MICR characters on MICR card stock. The MICR characters were then evaluated on an RDM MICR Verifier and exhibited a Document Average Signal Level of 87% and 41/45 characters were clearly MICR readable.

Drop-On-Demand Ink-Jet Ink Formulation B

Another ink-jet ink composition including a metal oxide dispersion prepared in accord with the invention herein was formulated. This ink-jet ink formulation, Formulation B, was similar to the first formulation, Formulation A, but used a dispersion that had been subjected to additional grinding and filtration. This ink was filtered just as the Formulation A ink was filtered, but then was further filtered by passing through a Fisher P8 filter.

MICR Ink-Jet Formulation B

| | |
|---|---|
| Dispersion 1 (30% oxide; ball milled for 4 days and micronized) | 50.00 |
| Carbon Black Ink-Jet Ink* | 35.00 |
| Deionized Water | 14.50 |
| Ultadditive 3010E/50 (defoamer) | 0.50 |
| Total | 100.00 |
| Percent Solids | 24.93 |
| Percent Pigment (Oxide + Carbon Black) | 15.26 |
| Percent Oxide | 14.00 |
| *Carbon Black Ink-Jet Ink: | |
| Cabojet 300 (15.1% Carbon Black in water) | 23.82 |
| Distilled Water | 53.99 |
| 2-Pyrollidone | 18.73 |
| 1,5-Pentanediol | 3.32 |
| Surfonyl 465 | 0.09 |
| Proxel GL (biocide) | 0.09 |
| Total | 100.04 |

The Formulation B Ink-Jet Ink was tested in accord with the testing performed on Formulation A and demonstrated a Document Average Signal Level of 89% and exhibited 44/45 characters that were MICR readable. The printed characters for this Formulation B displayed increased sharpness as compared to the characters printed from the Formulation A Ink-Jet Ink. This is attributed to the additional milling and filtration procedure used in developing this sample.

The ink-jet ink formulations, including the metal oxide dispersion prepared in accord with the processing set forth herein, were also tested in continuous type print equipment. For this testing, a continuous ink-jet print head set-up was prepared. The system was a continuous recirculating flow system that allowed for the evaluation of jetting properties of the ink through the individual print head nozzles under continuous use. The print head system was set up as a generator for the ink stream through the individual nozzles. There was no deflection unit. The individual ink streams through the nozzles were evaluated with a lighted magnifying inspection light for straightness of each ink stream going through each nozzle. Any curvature of a stream or blockage of a nozzle was noted. The system was monitored under pressure and any change to the pressure was noted. There were two filters in line in the system.

A straight stream without any curvature was a positive indication that no blockage was occurring due to large particle size or agglomeration. The dark black color of the stream was an indication that the pigment and the magnetic particles were jetting satisfactorily and passing properly through the in-line filters Continuous Ink-Jet Ink Formulation C

| | |
|---|---|
| Magnetic Oxide | 40.0 |
| Distilled Water | 56.0 |
| Surfonyl 324CT | 2.0 |
| Tamol 731A | 2 0 |
| Total | 100.0 |

This formulation was ball milled for 4 days and diluted to 15% solids with distilled water. The formulation was tested on the continuous print set-up as described above. The ink started jetting at 10 psi but exhibited partial print head nozzle blockage after 15 minutes with pressure of 14 psi and by 30 minutes was experiencing total print head nozzle blockage at a pressure of greater than 30 psi.

The same formulation as Formulation C was modified according to the following:

Continuous Ink-Jet Ink Formulation D

| | | |
|---|---|---|
| Formulation C (ball milled for 4 days) | | 25.00 |
| Carbon Black Ink-Jet Ink | | 75.00 |
| Cabojet 300 (15.1% Carbon Black in water) | 23.82 | |
| Distilled Water | 53.99 | |
| 2-Pyrollidone | 18.73 | |
| 1,5-Pentanediol | 3.32 | |
| Proxel GXL (biocide) | 0.09 | |
| Total | 100.00 | 1.00 |

This formulation was tested in the continuous print set-up in accord with the testing performed on Formulation C. Formulation D started jetting at 10 psi and continued with good nozzle flow for 2 hours, at which time a slight downward curvature was noted in the spray from the nozzle. The pressure was raised to 20 psi and good flow properties resumed. The system was allowed to sit overnight, and then was started up again the following day. The formulation performed in keeping with the good performance exhibited during the first day during the second day of testing, thus showing that the ink did not clog the nozzle upon sitting overnight.

The foregoing demonstrates an unexpected advantage in formulating and the performance parameters exhibited by MICR ink-jet ink if that ink contains a small particle size iron oxide pigment. It further demonstrates that the ink can be further enhanced in several ways, including coating the pigment particles, adding a combination of surfactants, preparing a pre-dispersion for use in the final ink, and filtering and grinding the dispersion using a combination of techniques. Finally, by employing a combination of these parameters an ink exhibiting a synergistic affect with regard to performance is attained.

What we claim is:

1. A process for preparing a metal oxide pre-dispersion comprising a homogeneous suspension of metal oxide pigment in an aqueous solution, said process comprising the steps of: (1) preparing an aqueous solution of at least one surfactant in an aqueous medium with thorough mixing; (2) slowly adding a small particle size metal oxide pigment, having a particle size of less than about 0.5 $\mu$, and selected from the group consisting of iron, cobalt, manganese, chromium, neodynium, lanthanum, copper, vanadium, yttrium, and mixtures thereof, to said aqueous solution with continuous high speed mixing to create a metal oxide pre-dispersion; and (3) adding said metal oxide pre-dispersion to a milling apparatus for a period of time sufficient to produce a homogeneous suspension of said metal oxide pigment in said metal oxide pre-dispersion.

2. The process of claim 1 wherein said milling apparatus does not include grinding media.

3. The process of claim 1 including the additional step of milling said suspension for an extended period of time to reduce the particle size of said metal oxide pigment.

4. A process for preparing a metal oxide pre-dispersion comprising a homogeneous suspension of metal oxide pigment in an aqueous solution, said process comprising the steps of: (1) preparing an aqueous solution of at least one surfactant in an aqueous medium with thorough mixing; (2) slowly adding a small particle size metal oxide pigment, having a particle size of less than about 0.5 $\mu$, to said aqueous solution with continuous high speed mixing to create a metal oxide pre-dispersion; (3) adding said metal oxide pre-dispersion to a milling apparatus for a period of time sufficient to produce a homogeneous suspension of said metal oxide pigment in said metal oxide pre-dispersion; and (4) milling said suspension for an additional period of time to further reduce the particle size of said metal oxide pigment, wherein said additional milling is conducted in a conventional grinding appartus.

5. The process of claim 3 including a further step of grinding using a non-conventional grinding means.

6. The process of claim 1 including an additional filtration step comprising filtering said suspension to remove large metal oxide particles.

7. The process of claim 6 wherein said filtration is conducted using a single filter.

8. The process of claim 6 wherein said filtration is conducted using a series of step-down filters.

9. The process of claim 5 wherein said non-conventional grinding means is microfluidization.

10. A process for preparing a metal oxide pre-dispersion for MICR ink-jet ink applications comprising the steps of:
(1) mixing a surfactant with distilled water at high speed to form an aqueous solution;
(2) continuing to mix said aqueous solution at high speed while slowly adding a metal oxide pigment selected from the group consisting of iron, cobalt, manganese, chromium, neodynium, lanthanum, copper, vanadium, yttrium, and mixtures thereof to said aqueous solution to create a metal oxide pre-dispersion;
(3) adding said metal oxide pre-dispersion to a milling apparatus lacking any grinding media and mixing for an amount of time sufficient to obtain a homogeneous suspension of said metal oxide pigment in said metal oxide pre-dispersion;
(4) removing said suspension to a conventional grinding apparatus including grinding media and milling for a period of several days or for a time sufficient to reduce the metal oxide particle size;
(5) removing said suspension to a non-conventional grinding apparatus for further milling; and
(6) filtering said suspension in a series of step down filters to remove any particles having a particle size in excess of the nozzle size of the print head on a printing device.

11. The process of claim 10 wherein said metal oxide pigment has an average particle size of less than or equal to about 0.5 $\mu$.

12. A process for preparing a metal oxide pre-dispersion for MICR inkjet ink applications comprising a homogeneous suspension of metal oxide pigment in an aqueous solution, said process comprising the steps of: (1) preparing an aqueous solution of at least one surfactant in an aqueous medium with thorough mixing; (2) slowly adding a small particle size metal oxide pigment, having a particle size of less than about 0.5 $\mu$, to said aqueous solution with continuous high speed mixing, wherein said metal oxide pigment is coated with a hydrophilic inorganic silicate coating, to create a metal oxide pre-dispersion; and (3) adding said metal oxide pre-dispersion to a milling apparatus for a period of time sufficient to produce a homogeneous suspension of said metal oxide pigment in said metal oxide pre-dispersion.

13. A process for preparing a metal oxide pre-dispersion for MICR ink-jet ink applications comprising the steps of:

(1) mixing a surfactant with distilled water at high speed to form an aqueous solution;

(2) continuing to mix said aqueous solution at high speed while slowly adding a metal oxide pigment coated with a hydrophilic inorganic silicate coating to said aqueous solution to create a metal oxide pre-dispersion;

(3) adding said metal oxide pre-dispersion to a milling apparatus lacking any grinding media and mixing for an amount of time sufficient to obtain a homogeneous suspension of said metal oxide pigment in said metal oxide pre-dispersion;

(4) removing said metal oxide pre-dispersion to a conventional grinding apparatus including grinding media and milling for a period of several days or for a time sufficient to reduce the metal oxide particle size;

(5) removing said metal oxide pre-dispersion to a non-conventional grinding apparatus for further milling; and (6) filtering said metal oxide pre-dispersion in a series of step down filters to remove any particles having a particle size in excess of the nozzle size of the print head on a printing device.

\* \* \* \* \*